Patented Feb. 28, 1950

2,498,750

UNITED STATES PATENT OFFICE 2,498,750

PLASTICIZED CELLULOSE PROPIONATE

Leo S. Birnbaum, Newark, John H. Prichard, Springfield, and Walter D. Paist, Orange, N. J., assignors to Celanese Corporation of America, a corporation of Delaware No Drawing. Application November 9, 1946, Serial No. 708,942

5 Claims. (Cl. 106—181)

This invention relates to thermoplastic molding compositions and relates more particularly to molding compositions comprising cellulose propionate, which compositions yield molded articles of superior physical properties.

The organic derivatives of cellulose are widely employed in the formulation of valuable thermoplastic molding materials. The cellulose derivatives most generally employed commercially have been cellulose acetate and ethyl cellulose, with cellulose acetate-butyrate a more recent addition to the field. All of these cellulose derivatives find wide use as thermoplastics and the choice of the particular cellulose derivative to be employed in a specific application is dictated not only by such factors as cost, ease of processing, finished appearance, etc., but also by the combination of physical properties required in the finished, molded articles. Up to the present, cellulose propionate has not been an important commercial factor in the thermoplastic field due, in the main, to the fact that it presented molding difficulties. The preparation of suitable formulations having desirable molding characteristics and yielding molded articles which conform to high physical standards has proven to be far from simple. When cellulose propionates having no or almost no free hydroxyl groups are employed, a satisfactory conversion and plastification on the hot malaxating rolls employed in the art or in a Banbury mixer is attended with considerable difficulty. The molded products obtained by molding such compositions, employing the usual injection or compression molding methods, exhibit low impact strength, and/or are found to warp seriously when exposed to a combination of heat and high relative humidity. Furthermore, such cellulose propionate molding compositions have an undesirably high Olsen flow temperature. When hydrolyzed cellulose propionates having 0.5 to 0.7 or more free hydroxyl groups are employed, the above disadvantages are overcome somewhat but other, and equally undesirable, characteristics develop. With cellulose propionates in this range of free hydroxyl value, namely, 0.5 to 0.7 free hydroxyl groups, serious blushing difficulties are encountered under elevated temperature and humidity, i. e. exposure at 120° F. for 24 hours at 100% relative humidity. In addition, the cellulose propionates of 0.5 to 0.7 or more, free hydroxyl groups have a relatively high water absorption which contributes to their dimensional instability. These properties are quite disadvantageous and hinder the satisfactory commercial application of cellulose propionate molding compositions.

It is, therefore, an important object of this invention to provide thermoplastic molding compositions having a basis of cellulose propionate which, when subjected to molding operations under conditions of elevated temperature and pressure, yield molded articles which are tough, dimensionally stable and more resistant to blushing.

Another object of this invention is the provision of cellulose propionate molding compositions capable of being molded with a short molding cycle, possessing an increased molding range and yielding highly polished, molded articles which may be finished with relative ease.

A further object of this invention is to provide cellulose propionate molding compositions which can be molded into articles of high impact strength, which property does not vary substantially with variations in molding temperature.

Other objects of this invention will appear from the following detailed description.

We have now found that cellulose propionate molding compositions yielding molded articles of diminished blushing, warping and other undesirable properties may be obtained by plasticizing hydrolyzed cellulose propionates having from about 0.2 to about 0.4 free hydroxyl groups therein, and preferably, about 0.3 free hydroxyl groups per glucose unit, with an organic acid ester or a mixture of esters, having a plasticizing action thereon, of the following general formula

wherein $n$ is 0 to 10, and $R_1$ and $R_2$ are the same or different alkyl, alkoxyalkyl, cycloalkyl, alkaryl, hydroaryl, aryloxyalkyl or aryl radicals. The use of dibutyl sebacate or di-butoxyethyl sebacate in particular, yields molding compositions forming molded articles possessing an outstanding combination of properties.

The organic acid ester plasticizers may be formed by esterifying a dibasic organic acid, such as oxalic acid, malonic acid, succinic acid, glutaric acid, adipic acid, azelaic acid or decamethylene dicarboxylic acid, for example, with a monohydroxy aliphatic alcohol having up to about twelve carbon atoms such as, for example, methyl, ethyl, propyl, butyl, amyl, hexyl, heptyl, octyl, decyl or dodecyl alcohol. Di- or polyhydroxyl alcohols, such as, for example, the glycols or glycerols which have been partially etherified or esterified having a free hydroxyl group may also be employed. Cyclic hydroxy compounds, such as benzyl alcohol, cyclohexanol, phenol, cresol, dihydro- or tetrahydrophenol are also suitable as the alcohol component of the plasticizing compounds we may employ.

Advantageously, the dibasic organic acid and the hydroxy compound with which said acid is esterified are so chosen that the resulting ester contains at least 14 carbon atoms. Thus, for example, where oxalic acid is the dibasic acid component of the plasticizer employed, the alcoholic component of a suitable oxalate plasticizer should contain at least 6 carbon atoms, so that the resulting ester will contain a minimum of 14 carbon atoms. To illustrate more specifically, when oxalic acid is esterified with octyl alcohol the di-octyl oxalate formed contains eighteen carbon atoms. Again, employing sebacic acid and esterifying the latter with butyl alcohol, the di-butyl sebacate obtained will also contain eighteen carbon atoms. Where adipic acid is esterified with amyl alcohol, there is formed di-amyl adipate which contains sixteen carbon atoms, which is quite satisfactory for use as a plasticizer in accordance with our novel process.

Other examples of the ester plasticizers falling within the purview of our invention and which may be employed in forming our novel cellulose propionate molding compositions are compounds such as di-butyl sebacate, di-benzyl sebacate, butyl benzyl sebacate, di-octyl oxalate, di-octyl azelate, di-butoxyethyl sebacate, di-hexyl adipate, di-octyl succinate, di-decyl succinate, di-octyl adipate, di-decyl adipate, ditetrahydrofurfuryl adipate, di-hexyl sebacate, di-octyl sebacate, di-benzyl "Carbitol" sebacate, di-butoxyethyl succinate, and di-butoxyethyl adipate, as well as the di-hexyloxyethyl and the diphenoxy ethyl esters of succinic, adipic and sebacic acids. The choice of the particular plasticizer employed depends upon consideration of a number of factors, such as the solvent action desired, the molding or flow temperature, volatility, moisture resistance necessary, cost, etc. Certain esters of stearic acid such as butyl stearate or butoxyethyl stearate, for example, may be employed advantageously in combination with the above dicarboxylic acid esters for plasticizing the cellulose propionate molding composition. Other auxiliary plasticizers which may be used are the phosphate esters such as trioctyl phosphate, phthalate esters, such as di-butyl phthalate, and the glycollate esters, such as ethyl phthallyl ethyl glycollate, as well as hydrocarbons having a plasticizing action on the cellulose propionate, such as mono-amyl naphthalene, di-amyl naphthalene or a mixture of partially hydrogenated isomeric terphenyls.

Optimum results are obtained in accordance with our invention by employing dibutyl sebacate or di-butoxyethyl sebacate as the plasticizer in said cellulose propionate molding compositions either alone or in combination with butyl stearate or butoxyethyl stearate, the mixture employed containing up to 50% by weight of either of the latter auxiliary plasticizers.

The plasticizer content of the cellulose propionate molding compositions may vary depending upon the characteristics desired in the molded product and the use to which the final molded product is to be put. The higher the proportion of plasticizer present the higher in general will be the impact strength of the molded article, and the lower the plasticizer content the greater the hardness and stiffness of the molded article. The maximum plasticizer content is determined by the appearance of an undesirable exudation of plasticizer when the molded article is exposed to conditions of high relative humidity, say to 100%, for 24 hours at 100° F. Usually, the incorporation of from 5 to 30 parts by weight of plasticizer in 100 parts by weight of the cellulose propionate having 0.2 to 0.4 free hydroxyl groups produces a molding composition yielding molded articles of outstanding properties, the variation in the amount of plasticizer present producing hard, medium and soft formulations in the order of increased plasticizer content.

The molding compositions may be prepared in various ways so as to ensure uniform plastification as well as the production of particles of said cellulose propionate composition of substantially uniform size. Thus, the cellulose propionate and the desired quantity of plasticizer may be mixed together employing heated malaxating rolls to soften the cellulose propionate, with the heat-softened mixture passing through the nip of the heated rolls and being mixed on the rolls until it is homogeneous and thoroughly converted. The converted plastic mass may then be taken off the rolls in sheets and the latter then cut into particles of a size which is suitable for use in compression, extrusion or injection molding operations. Our novel plasticized cellulose propionate composition may also be employed for the production of sheet materials by kneading the cellulose propionate with the desired plasticizer and suitable volatile solvents, block pressing, cutting sheets of the desired thickness from the block and seasoning the cut sheets. The seasoned sheets may be molded to any desired shape.

Cellulose propionates having from 0.2 to 0.4 free hydroxyl groups per glucose unit may be obtained by treating cellulose with an esterifying medium comprising propionic acid, propionic anhydride and a suitable esterification catalyst such as sulfuric acid. The esterification may be effected either with or without a pretreatment of the cellulose designed to render the same more reactive and more readily esterifiable when treated with the esterification mixture. The cellulose is entered into the esterification medium, and, after the esterification reaction is completed, the fully esterified cellulose propionate produced by said reaction is obtained in the form of a viscous, homogeneous solution. Water is added to this solution to convert any unreacted propionic anhydride remaining to propionic acid. After the addition of a further quantity of water for ripening, the cellulose propionate is permitted to ripen whereby propionyl groups are hydrolyzed therefrom to form a partially hydrolyzed cellulose propionate having from 0.2 to 0.4 free hydroxyl groups. Water or other non-solvent for the cellulose propionate is then added to the solution in amounts sufficient to precipitate the ripened cellulose propionate and the latter is then washed with water, stabilized if necessary in water at an elevated temperature and pressure, washed again and dried. The fibrous cellulose propionate may then be combined with one of the aforementioned plasticizers or mixture of plasticizers and converted to a homogeneous molding composition, as described. The cellulose propionates having 0.2 to 0.4 free hydroxyl groups are soluble in acetone and butyl acetate. Preferably, our novel molding compositions are formed employing those cellulose propionates containing 0.2 to 0.4 free hydroxyl groups which have a viscosity of from 40 to 200 centipoises and optimum results are obtained employing cellulose propionate having about 0.3 free hydroxy groups and a viscosity of from 70 to 125 centipoises.

In order further to illustrate our invention, but without being limited thereto, the following examples are given:

EXAMPLE I 100 parts by weight of cellulose propionate having 0.29 free hydroxyl groups are combined with 15 parts by weight of a 4:1 mixture of dibutyl sebacate and butoxyethyl stearate and about one part by weight of a suitable black dye are added, the mixing being effected by employing converting rolls heated to about 300° F. The conversion is completed in about ½ hour of processing yielding a homogeneous, thermoplastic cellulose propionate composition colored a jet black and having an A. S. T. M. flow test temperature of about 165° C. The hot, converted, plastic composition is taken off the rolls in the form of thin sheets which are cooled and then broken up into particles of a suitable size for injection or compression molding operations.

The cellulose propionate molding composition thus formed is injection molded to form telephone bases at a temperature of 450° F. under a pressure of 15,000 pounds per square inch with a molding cycle of 60 seconds. The molded telephone base obtained has a smooth surface finish and easily passes the severe strength and toughness test which said bases must withstand to be commercially acceptable. This test comprises subjecting the base, properly weighted, to eight consecutive vertical drops from a height of 25 inches on to a steel block. No cracking of the base is observed. The base is also completely unaffected by exposure to seven cycles of an accelerated ageing test, each individual cycle comprising exposure of the molded piece for 48 hours at 95° F. and 95% relative humidity, followed by 48 hours exposure at 77° F. and 50% relative humidity, then 48 hours at 95° F. and 95% relative himidity and finally 48 hours at 77° F. and 50% relative humidity, this complete cycle being repated a total of seven times.

EXAMPLE II

A series of cellulose propionate molding compositions are prepared, as described in Example I, employing a mixture of dibutyl sebacate and butoxyethyl stearate in a weight ratio of a 4:1 as plasticizer, the total amount of the plasticizer mixture employed varying, in equal increments of 5 parts, from 5 to 25 parts by weight for each 100 parts of cellulose propionate. The compositions are then each injection molded at the cold point, i. e. a primary cylinder temperature of 550 to 410° F. and a secondary cylinder temperature of 525 to 385° F., respectively, to form tubes four inches long, 1½ inches outside diameter, and having a wall thickness of 0.1 inch, employing a molding pressure of 15,000 pounds per square inch of stock. Additional tubes are also injection molded at 40° F. above the cold point. The cold point is defined as that minimum primary and secondary injection cylinder temperature at which thermoplastic molding composition just fills the mold cavity consistently on a regular molding cycle at the given pressure. Any lesser pressure, feed rate or cylinder temperature results in "short shots," indicating a departure from "cold point" conditions.

The molded cylinders obtained are then subjected to a series of fatigue impact tests at 68° F. which test comprises allowing a falling weight to strike the wall of the cylinder while the latter is held firmly in a horizontal position and resting on a steel block. Employing a weight of 2 pounds and increasing the height of the free fall of the weight by increments of six inches, the cylinders behave as follows:

At 68° F. with 2.0 pound weight

| Plasticizer Content | Impact Failure |
|---|---|
| Parts by weight | Foot-Pounds |
| 5 | 3.08 |
| 10 | 4.25 |
| 15 | 6.25 |
| 20 | no failure at 14 |
| 25 | no failure at 14 |

When the fatigue impact test is conducted at 0° F. employing a 0.5 pound weight, the results are as follows:

At 0° F. with 0.5 pound weight

| Plasticizer Content | Impact Failure |
|---|---|
| Parts by weight | Foot-Pounds |
| 5 | 1.16 |
| 10 | 1.40 |
| 15 | 1.60 |
| 20 | 2.26 |
| 25 | no failure at 3.5 |

The foregoing tests indicate the outstanding toughness of these novel cellulose propionate molding compositions. When these cellulose proprionate compositions are compared with cellulose acetate-butyrate of equivalent impact strengths, from 30 to 50% greater flexural strength or stiffness is observed in the case of the cellulose propionate compositions. Also, with the same A. S. T. M. (D569-44T) flow temperatures or actual molding temperatures, we obtain higher impact strengths with cellulose propionate.

EXAMPLE III 100 parts by weight of cellulose propionate having 0.32 free hydroxyl groups are mixed with 15 parts by weight of a plasticizer comprising equal parts by weight of dibutyl sebacate and dioctyl sebacate, the mixture converted to a homogeneous, plastic mass on converting rolls and then divided into particles to form a molding composition, as described above. The molding composition has an A. S. T. M. flow test temperature of 167° C. The molding composition is injection molded at 440° F. into test bars 5 inches by ½ inch by ⅛ inch. The test bars of this plasticized cellulose propionate composition have a flexural strength of 6200 pounds per square inch, a Rockwell hardness of 83 and an average Izod impact strength of 8.4 foot-pounds/inches. The test strip requires 4 bends to break it.

EXAMPLE IV 100 parts by weight of cellulose propionate with 0.4 free hydroxyl groups and about 85 centipoises viscosity are combined with 5 parts of dioctyl oxalate and one part of a maroon opaque pigment in the manner described in the preceding examples at a temperature of 340° F. for 30 minutes.

Molding powder is formed with an A. S. T. M. flow temperature of 177° C. This composition is injection-molded to form fountain pen barrels and caps at a temperature of 500° F. under a pressure of 15,000 pounds per square inch on the material. The molding cycle is 60 seconds. The molded pieces have a smooth surface and very high luster. The pieces are machined with ease to form the threads, pulling lever slot, and recesses for the spring clip and ring on the cap. The barrel and cap are subjected to the following test which has been found to approximate several years of fountain pen service, i. e. 48 hours at 77° F. and 50% relative humidity followed by 24 hours at 120° F. and 100% relative humidity and 48 hours at 77° F. and 50% relative humidity. After this test the fit of the barrel to the cap is still excellent and unchanged from the original. No warpage or distortion of the barrel due to the pressure of the pulling lever, nor of the cap due to the pressure of the spring clip and ring is observed.

EXAMPLE V 100 parts by weight of cellulose propionate having 0.23 free hydroxyl groups are combined with 20 parts by weight of di-butoxyethyl adipate, the mixing being effected by employing heated converting rolls at a temperature of about 290° F. The conversion is completed in about ½ hour of processing, yielding a homogeneous, cellulose propionate composition having an A. S. T. M. flow temperature of 154° C. Finely divided particles of molding composition are prepared therefrom. The cellulose propionate molding composition thus formed is useful for injection-molding of automobile steering wheels embodying a metal core. Cellulose acetate and celluluose acetate butyrate molding compositions considered most appropriate for this application were also molded into test pieces at the following temperatures:

|  | ASTM Flow, °C. | Molding Temp., °F. | |
|---|---|---|---|
|  |  | Front. cyl. | Back cyl. |
| Cellulose acetate | 128 | 360 | 320 |
| Cellulose acetate-butyrate | 135 | 380 | 350 |
| Cellulose propionate | 154 | 400 | 370 |

The molded test piece, designed to simulate the performance of an actual steering wheel, is a straight cylindrical metal rod insert ⅝ inch thick and 16 inches long groove circumferentially about ½ inch from both ends, surrounded by a cylindrical plastic wall ⅛ inch thick. Even though the cellulose propionate composition has about 20° higher flow temperature than cellulose acetate-butyrate, nevertheless, the molding temperature is only 20° higher. However, if cellulose acetate-butyrate with a flow temperature of 154 had been employed, the minimum flow temperature would have to be about 425° F. The molded test pieces are submitted to the following test cycle:

(a) Minus 40° F. for 24 hours
(b) 175° F. dry heat for 24 hours
(c) Minus 40° F. for 24 hours
(d) 175° F., 75% relative humidity for 24 hours The results of this test show that the test piece comprising cellulose acetate cracked and unmolded, and the cellulose acetate-butyrate test piece unmolded considerably and bulged badly over the grooves. The cellulose propionate test piece unmolded and bulged only slightly and was otherwise superior to cellulose acetate-butyrate.

Samples were also subjected to a low temperature fatigue impact test comprising successive blows of a 2 pound weight dropped from a height, initially 6 inches, increasing by 6 inch increments until a crack developed. The samples were conditioned for 3 hours at minus 40° F., prior to testing. Average foot-pounds reached at failure of the test pieces are given in the table below. In addition, the Durometer hardness (D scale) is given:

|  | Impact Strength, ft. lbs. | Durometer Hardness D-Scale |
|---|---|---|
| Cellulose acetate | 1.8 | 75 |
| Cellulose acetate-butyrate | 5.5 | 73 |
| Cellulose propionate | 7.1 | 73 |

Thus, it is seen that with substantially equal surface hardness the cellulose propionate is distinctly superior in impact strength, notwithstanding that the other two plastics have lower A. S. T. M. flows and molding temperatures and would be expected to yield higher impact strengths.

EXAMPLE VI

Cellulose propionate of 0.4 free hydroxyl groups and 10 centipoises viscosity is kneaded with the following formula:

Parts by weight
Cellulose propionate (0.4 free hydroxyl groups) _____ 100
Di-(2-ethyl hexyl) sebacate _____ 7½
Ethyl methyl ketone _____ 80

The kneaded mass is filtered, rolled and pressed into a cake for two hours at 360° F. at 500 pounds per square inch pressure. Sheets are cut, seasoned and finished in the usual way. They show the following physical properties:

Tensile strength
 (sheet .010 inch thick) _____ kg./mm.$^2$__ 4.7
Elongation _____ per cent__ 50
Tensile product _____ 235
No. of folds _____ 50
Moisture absorption _____ per cent__ 2.0

The plasticized cellulose propionate molding compositions of our invention are particularly valuable for injection molding operations, since they may be molded at lower temperatures than are necessary for cellulose acetate or cellulose acetate-butyrate compositions having the same A. S. T. M. flow test temperature and from which molded articles of the same hardness or stiffness properties are obtained. The cellulose propionate molding compositions have a wide molding range with good fluidity and comparative freedom from "weld" lines which enables the thermoplastic material to fill out a die having relatively small gates, where such action is not possible with cellulose acetate molding compositions. In addition, the molding cycle employed for said cellulose propionate compositions is shorter than that with other thermoplastic cellulose derivatives. Our compositions, moreover, lend themselves very satisfactorily to extrusion operations. The dry cellulose propionate molding powder is introduced into an extruder and heat and pressure are applied and the material leaves the nozzle in the form of a rod, strip, etc. We have found that when using cellulose propionate the extrusion proceeds very easily and the material hardens rapidly in air, which is a very desirable feature.

With respect to the working properties of molded articles of our compositions, the latter may be readily machined with better results than are obtainable with cellulose acetate or cellulose acetate-butyrate materials. Furthermore, since the "skinning" and surface lamination effects are not encountered in cellulose propionate molded articles of our novel composition, buffing, ashing, polishing, etc. are easily accomplished. Converting or homogenization on the hot converting rolls is more rapid than in the case of other thermoplastic cellulose derivatives and little odor is evolved in molding in contrast to the rather strong and unpleasant odor emitted when cellulose acetate and acetate-butyrate, for example, are being molded.

Our novel compositions may be colored with any suitable pigment or dye or rendered iridescent by the addition of pearl essence or other iridescent material thereto. Furthermore, for protection against the harmful effects of ultraviolet light from 1 to 2 parts by weight of phenyl salicylate or other light stabilizer may be incorporated in the composition for each 100 parts by weight of cellulose propionate. For protection against undue viscosity loss when said cellulose propionate compositions are exposed to elevated temperatures during molding from 0.1 to 0.5 part by weight of either magnesium acetate or calcium lactate may be employed for each 100 parts by weight of cellulose propionate.

It is to be understood that the foregoing detailed description is given merely by way of illustration and that many variations may be made therein without departing from the spirit of our invention.

Having described our invention, what we desire to secure by Letters Patent is:

1. A thermoplastic composition of matter consisting of cellulose propionate having from 0.2 to 0.4 free hydroxyl groups therein per glucose unit plasticized with from 4.5 to 23% by weight of a plasticizer selected from the group consisting of di-butoxyethyl adipate and di-hexyloxyethyl adipate.

2. A thermoplastic composition of matter consisting of cellulose propionate having from 0.2 to 0.4 free hydroxyl groups therein per glucose unit plasticized with from 4.5 to 23% by weight of di-butoxyethyl adipate.

3. A thermoplastic composition of matter consisting of cellulose propionate having from 0.2 to 0.4 free hydroxyl groups therein per glucose unit plasticized with from 4.5 to 23% by weight of di-hexyloxyethyl adipate.

4. A thermoplastic composition of matter consisting of cellulose propionate having about 0.3 free hydroxyl groups therein per glucose unit plasticized with from 4.5 to 23% by weight of di-butoxyethyl-adipate.

5. A thermoplastic composition of matter consisting of cellulose propionate having about 0.3 free hydroxyl groups therein per glucose unit plasticized with from 4.5 to 23% by weight of di-hexyloxyethyl adipate.

LEO S. BIRNBAUM.
JOHN H. PRICHARD.
WALTER D. PAIST.

REFERENCES CITED

The following references are of record in the file of this patent:

UNITED STATES PATENTS

| Number | Name | Date |
| --- | --- | --- |
| 1,309,980 | Clarke | July 15, 1919 |
| 2,261,140 | Conkem | Nov. 4, 1941 |
| 2,387,773 | Salo | Oct. 30, 1945 |
| 2,387,774 | Salo | Oct. 30, 1945 |
| 2,410,685 | Salo | Nov. 5, 1946 |

FOREIGN PATENTS

| Number | Country | Date |
| --- | --- | --- |
| 428,160 | Great Britain | May 8, 1935 |

OTHER REFERENCES

Wiggam et al., "Ind. Eng. Chem.," 26, 553 (1934).